(12) United States Patent
Sohn et al.

(10) Patent No.: US 12,417,634 B2
(45) Date of Patent: Sep. 16, 2025

(54) OCCLUSION DETECTION AND OBJECT COORDINATE CORRECTION FOR ESTIMATING THE POSITION OF AN OBJECT

(71) Applicant: HANWHA TECHWIN CO., LTD., Seongnam-si (KR)

(72) Inventors: Chanyoung Sohn, Seongnam-si (KR); Ga Young Kim, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 383 days.

(21) Appl. No.: 18/088,343

(22) Filed: Dec. 23, 2022

(65) Prior Publication Data

US 2023/0206643 A1    Jun. 29, 2023

(30) Foreign Application Priority Data

Dec. 27, 2021    (KR) .................. 10-2021-0188664

(51) Int. Cl.
| | | |
|---|---|---|
| *G06V 40/10* | (2022.01) | |
| *G06T 7/60* | (2017.01) | |
| *G06T 7/73* | (2017.01) | |
| *G06V 10/26* | (2022.01) | |
| *G06V 10/764* | (2022.01) | |
| *G06V 20/52* | (2022.01) | |

(52) U.S. Cl.
CPC ............... *G06V 20/52* (2022.01); *G06T 7/60* (2013.01); *G06T 7/74* (2017.01); *G06V 10/26* (2022.01); *G06V 10/764* (2022.01); *G06V 40/10* (2022.01); *G06T 2207/30196* (2013.01); *G06T 2207/30232* (2013.01); *G06V 2201/08* (2022.01)

(58) Field of Classification Search
CPC ...... G06V 20/52; G06V 10/26; G06V 10/764; G06V 2201/08; G06T 7/74; G06T 7/60; G06T 2207/30232
See application file for complete search history.

(56) References Cited

U.S. PATENT DOCUMENTS

| | | | |
|---|---|---|---|
| 11,080,544 B1* | 8/2021 | Kim ......................... | G06T 7/80 |
| 2009/0129630 A1* | 5/2009 | Gloudemans ........... | G06T 15/20 |
| | | | 382/103 |
| 2014/0161312 A1* | 6/2014 | Adachi .................. | G06V 40/10 |
| | | | 382/103 |
| 2020/0089962 A1* | 3/2020 | Narang ................... | G06T 11/20 |

* cited by examiner

*Primary Examiner* — Shaghayegh Azima
(74) *Attorney, Agent, or Firm* — Sughrue Mion, PLLC

(57) ABSTRACT

Disclosed is a image processing apparatus and a method for controlling the image processing apparatus. The image processing apparatus according to an embodiment of the present disclosure may identify an object from an acquired image, determine whether the object is hidden by another object by using an aspect ratio of a bounding box of the detected object, and based on the object being hidden, estimate an entire length of the object based on coordinate information of the bounding box. Accordingly, the size information of the hidden object may be efficiently identified while a large amount of database is applied or resources of the apparatus is minimized. The present disclosure may be in connection with a surveillance camera, an automotive driving vehicle, an artificial intelligence module of at least one of a user terminal or a server, a robot, an augmented reality (AR) device, a virtual reality (VR) device, a device related to a 5G service, and the like.

14 Claims, 14 Drawing Sheets

FIG. 7A
FIG. 7B
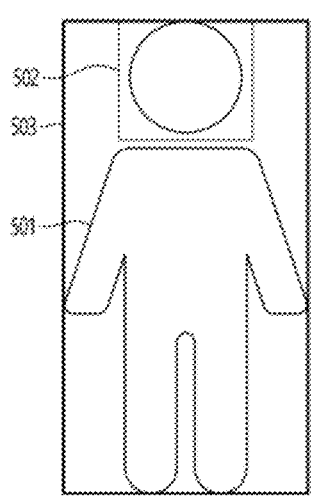
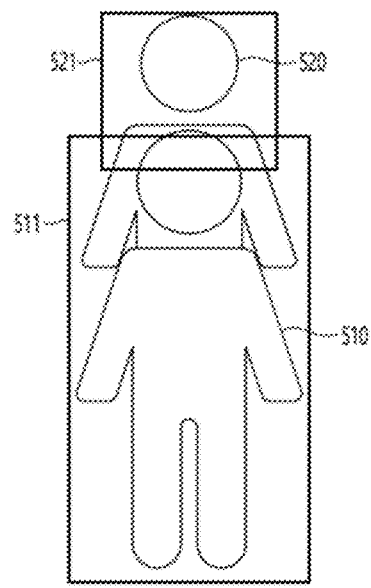
FIG. 8
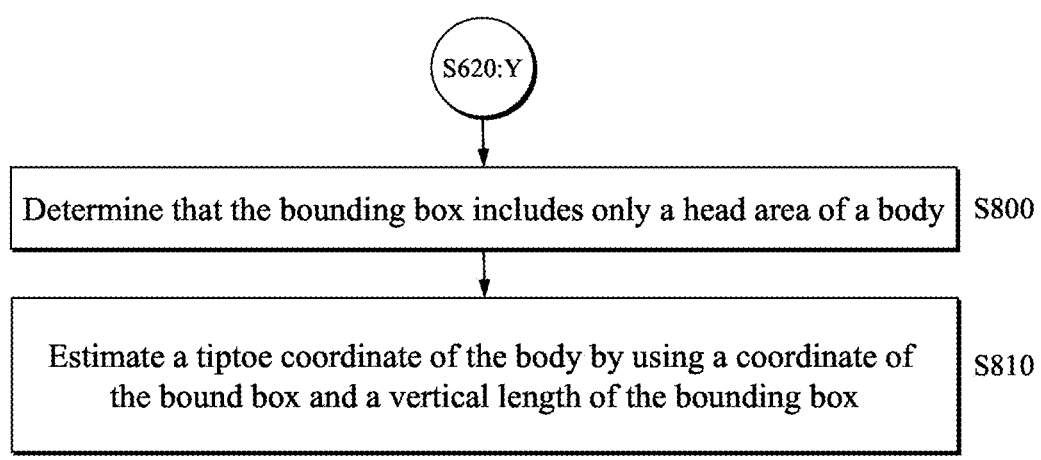

OCCLUSION DETECTION AND OBJECT COORDINATE CORRECTION FOR ESTIMATING THE POSITION OF AN OBJECT

CROSS TO REFERENCE TO RELATED APPLICATIONS

This application claims benefit of priority to Korean Patent Application No. 10-2021-0188664 filed on Dec. 27, 2021 in the Korean Intellectual Property Office, the disclosure of which is incorporated herein in its entirety by reference.

BACKGROUND

1. Field

The present disclosure relates to an image processing apparatus and a method for controlling the image processing apparatus.

2. Description of Related Art

In an object detection technique, when a person is hidden by an object or another person, it is hard to detect the person perfectly. Various techniques have been researched to solve the problem. The performance of a detector may be supplemented by using images photographed in many points of view or a sorting device, or based on a feature point.

However, such a method is hard to encure information of high reliability if a large amount of database is required, or a person is hidden. Furthermore, most of the sorting device merely considers human full detection, and there is a problem that three-dimensional position information of a person is not considered.

SUMMARY

In view of the above, the present disclosure provides a image processing apparatus and a method for controlling the image processing apparatus, which may increase the reliability of an occlusion detection result without a large amount of database.

In addition, the present disclosure provides a image processing apparatus and a method for controlling the image processing apparatus, which may correct coordinate information of a hidden object efficiently by using bounding box information that represents a detection object using a deep learning based occlusion detection result.

The objects to be achieved by the present disclosure are not limited to the above-mentioned objects, and other objects not mentioned may be clearly understood by those skilled in the art from the following description.

A image processing apparatus according to an embodiment of the present disclosure includes a image acquisition unit; and a processor configured to determine that at least a part of an object is occluded based on an aspect ratio of a bounding box that indicates an object detection result from a image acquired through the image acquisition unit being smaller than a predetermined reference aspect ratio and estimate the reference aspect ratio of the object, wherein different aspect ratios are applied to the reference aspect ratio depending on at least one of a type or an attribute of the object.

The type of the object may include at least one of a human, an animal, or a vehicle, and wherein the attribute of the object may include a feature which is classifiable with different categories among the objects of a same type.

The reference coordinate may be a coordinate for estimating a length of the object before being occluded in a state that at least a part of the object is occluded and may include coordinate information of at least one point between both ends in a length direction of the object which is before being occluded.

The processor may be configured to detect the object in the image by using a deep learning based algorithm, classify the type or the attribute of the detected object, and compare the aspect ratio of the bounding box with the predetermined reference aspect ratio based on the classified type or attribute of the detected object.

The predetermined reference aspect ratio may be changed depending on an installation angle of the image acquisition unit.

Based on the type of the object being a human body, and the aspect ratio of the bounding box being smaller than the reference aspect ratio, the processor may be configured to: determine that the bounding box includes a head area of the human body, estimate a tiptoe coordinate of the human body from a coordinate value of the head area, and calculate a length of an entire body of the human body.

The processor may be configured to: estimate a result of adding Y coordinate value among center coordinate values of the bounding box including the head area to an integer multiple of a vertical length of the bounding box as a tiptoe coordinate of the human body.

The integer value of the integer multiple may be a value of adding the predetermined reference aspect ratio to a value considering a sensitivity of the image acquisition unit.

The processor may be configured to: based on at least one object among at least two or more objects detected through the image acquisition unit being detected as the occlusion object, measure an actual distance between the two objects by applying a reference coordinate to the occlusion object.

The processor may be configured to: configure a two-dimensional center coordinate value based on a two-dimensional center coordinate value of the bounding box including the head area and a three-dimensional coordinate value of the human body based on calibration information of the image acquisition unit, acquire a three-dimensional coordinate value of a tiptoe from the three-dimensional coordinate value, and estimate a tiptoe coordinate of the human body by transforming the three-dimensional coordinate value of the tiptoe to a two-dimensional center coordinate value based on the calibration information of the image acquisition unit.

The processor may be configured to: estimate a reference coordinate for at least one occlusion object, generate a corrected bounding box of the occlusion object based on the estimated reference coordinate, and generate coordinate information of the corrected bounding box as input data of a deep learning model for classifying objects.

A method for controlling a image processing apparatus according to another embodiment of the present disclosure includes detecting an object from a image acquired through a image acquisition unit of the image processing apparatus; comparing an aspect ratio of a bounding box that indicates a detection result of the object with a predetermined reference aspect ratio; and determining that at least a part of an object is occluded based on the aspect ratio of the bounding box being smaller than the predetermined reference aspect ratio and estimating a reference coordinate of the object based on coordinate information of the bounding box, wherein different aspect ratios are applied to the reference aspect ratio depending on at least one of a type or an attribute of the object.

The object may include a human body, and the method may further include: determining that the bounding box includes a head area of the human body based on the aspect ratio of the bounding box being smaller than the reference aspect ratio; and estimating a result of adding Y coordinate value among center coordinate values of a top of the bounding box to an integer multiple of a vertical length of the bounding box as a tiptoe coordinate of the human body.

A gender of the detected object may be identified, and the method may further include: determining that the bounding box includes a head area of the human body based on the aspect ratio of the bounding box being smaller than the reference aspect ratio; configuring a two-dimensional center coordinate value based on a two-dimensional center coordinate value of the bounding box including the head area and a stature value of the human predetermined according to the gender and a three-dimensional coordinate value of the human body based on calibration information of the image acquisition unit; acquiring a three-dimensional coordinate value of a tiptoe from the three-dimensional coordinate value; and estimating a tiptoe coordinate of the human body by transforming the three-dimensional coordinate value of the tiptoe to a two-dimensional center coordinate value based on the calibration information of the image acquisition unit.

A image processing apparatus according to another embodiment of the present disclosure includes a image acquisition unit; and a processor configured to detect a human body from a image acquired through a image acquisition unit, compare an aspect ratio of a bounding box of the detected object with a predetermined reference aspect ratio, estimate a reference coordinate of an occlusion object based on at least a part of the detected human body being occluded, and acquire coordinate information of the corrected bounding box of the occlusion object based on the estimated reference coordinate, wherein the processor configures the coordinate information of the corrected bounding box as input data of a deep learning object detection model and outputs the object detection result.

Different aspect ratios may be applied to the reference aspect ratio depending on at least one of a type or an attribute of the object.

The type of the object may include at least one of a human, an animal, or a vehicle, and wherein the attribute of the object may include a feature which is classifiable with different categories among the objects of a same type.

The reference coordinate may be a coordinate for estimating a length of the object before being occluded in a state that at least a part of the object is occluded and may include coordinate information of at least one point between both ends in a length direction of the object which is before being occluded.

The processor may be configured to: determine the occlusion object based on the aspect ratio of the bounding box being smaller than the reference aspect ratio, determine that the bounding box of the occlusion object includes only a head area of the human body based on the occlusion object being a human, estimate a tiptoe coordinate of the human body from a coordinate value of the head area, and calculate a length of an entire body of the human body.

The processor may be configured to: estimate a result of adding Y coordinate value among center coordinate values of the bounding box including the head area to an integer multiple of a vertical length of the bounding box as a tiptoe coordinate of the human body, wherein the integer value of the integer multiple is a value of adding the predetermined reference aspect ratio to a value considering a sensitivity of the image acquisition unit.

The processor may be configured to: identify a gender of the detected human body, configure a two-dimensional center coordinate value based on a two-dimensional center coordinate value of the bounding box including the head area and a stature value of the human predetermined according to the gender and a three-dimensional coordinate value of the human body based on calibration information of the image acquisition unit, acquire a three-dimensional coordinate value of a tiptoe from the three-dimensional coordinate value, and estimate a tiptoe coordinate of the human body by transforming the three-dimensional coordinate value of the tiptoe to a two-dimensional center coordinate value based on the calibration information of the image acquisition unit.

A surveillance camera according to another embodiment of the present disclosure includes a image acquisition unit; and a processor configured to determine that at least a part of a human body being hidden by another object, based on an aspect ratio of a bounding box that indicates a detection result of the human body from the image acquired from the image acquisition unit being smaller than a predetermined reference aspect ratio, and estimate an entire body length of the human body based on coordinate information of the bounding box.

The processor may be configured to: detect the objet from the image by using a deep learning based on a YOLO (You Only Lock Once) algorithm, and compare the aspect ratio of the bounding box with the predetermined reference aspect ratio based on the detected object being a human.

The predetermined reference aspect ratio may be changed depending on an installation angle of the surveillance camera.

Based on the aspect ratio of the bounding box being smaller than the reference aspect ratio, the processor may be configured to: determine that the bounding box includes a head area of the human body, estimate a tiptoe coordinate of the human body from a coordinate value of the head area, and calculate a length of an entire body of the human body.

The processor may be configured to: estimate a result of adding Y coordinate value among center coordinate values of the bounding box including the head area to an integer multiple of a vertical length of the bounding box as a tiptoe coordinate of the human body.

The integer value of the integer multiple may be a value of adding the predetermined reference aspect ratio to a value considering a sensitivity of the surveillance camera.

The processor may be configured to: configure a two-dimensional center coordinate value based on a two-dimensional center coordinate value of the bounding box including the head area and a three-dimensional coordinate value of the human body based on calibration information of the surveillance camera, acquire a three-dimensional coordinate value of a tiptoe from the three-dimensional coordinate value, and estimate a tiptoe coordinate of the human body by transforming the three-dimensional coordinate value of the tiptoe to a two-dimensional center coordinate value based on the calibration information of the surveillance camera.

The processor may be configured to: detect the human body by using the deep learning based algorithm, classify a gender of the human body, and differently apply the predetermined human stature value depending on the classified gender.

A method for controlling a surveillance camera according to another embodiment of the present disclosure includes detecting an object from a image acquired through a image acquisition unit of the image processing apparatus; comparing an aspect ratio of a bounding box that indicates a detection result of the object with a predetermined reference aspect ratio; and determining that at least a part of an object is hidden by another object based on the aspect ratio of the bounding box being smaller than the predetermined reference aspect ratio and estimating a reference coordinate of the object based on coordinate information of the bounding box.

The object may include a human body, and the method for controlling a surveillance camera may further include: determining that the bounding box includes a head area of the human body based on the aspect ratio of the bounding box being smaller than the reference aspect ratio; and estimating a result of adding Y coordinate value among center coordinate values of a top of the bounding box to an integer multiple of a vertical length of the bounding box as a tiptoe coordinate of the human body.

The object may include a human body, and the method for controlling a surveillance camera may further include: determining that the bounding box includes a head area of the human body based on the aspect ratio of the bounding box being smaller than the reference aspect ratio; configuring a two-dimensional center coordinate value based on a two-dimensional center coordinate value of the bounding box including the head area and a stature value of the human predetermined according to the gender and a three-dimensional coordinate value of the human body based on calibration information of the surveillance camera; acquiring a three-dimensional coordinate value of a tiptoe from the three-dimensional coordinate value; and estimating a tiptoe coordinate of the human body by transforming the three-dimensional coordinate value of the tiptoe to a two-dimensional center coordinate value based on the calibration information of the surveillance camera.

A surveillance camera according to another embodiment of the present disclosure includes a image acquisition unit; and a processor configured to detect a human body from a image acquired through a image acquisition unit, based on at least a part of the human body being hidden by another object, determine that a bounding box of indicating a detection result of the human body includes a head area of the human body, estimate a tiptoe coordinate of the human body from a coordinate value of the head area, and calculate a length of an entire body of the human body.

The processor may be configured to: estimate a result of adding Y coordinate value among center coordinate values of the bounding box including the head area to an integer multiple of a vertical length of the bounding box as a tiptoe coordinate of the human body.

The integer value of the integer multiple may be a value of adding the predetermined reference aspect ratio to a value considering a sensitivity of the surveillance camera.

The processor may be configured to: identify a gender of the detected human body, configure a two-dimensional center coordinate value based on a two-dimensional center coordinate value of the bounding box including the head area and a stature value of the human predetermined according to the gender and a three-dimensional coordinate value of the human body based on calibration information of the surveillance camera, acquire a three-dimensional coordinate value of a tiptoe from the three-dimensional coordinate value, and estimate a tiptoe coordinate of the human body by transforming the three-dimensional coordinate value of the tiptoe to a two-dimensional center coordinate value based on the calibration information of the surveillance camera.

The processor may be configured to: determine that at least a part of the human body is hidden by another object, based on an aspect ratio of the bounding box of indicating a detection result of the human body being smaller than a predetermined reference aspect ratio.

A surveillance camera according to another embodiment of the present disclosure includes a image acquisition unit; and a processor configured to detect a human body from a image acquired through a image acquisition unit, based on at least a part of the human body being hidden by another object, determine that a bounding box of indicating a detection result of the human body includes only a head area of the human body, and estimate an entire body length of the human body based on a coordinate of the head area of the human body, wherein the processor may configure the image acquired through the image acquisition unit as input data, configure the object detection as output data, and detect the object by applying a deep learning neural network model.

A YOLO (You Only Lock Once) algorithm may be applied for the object detection.

The processor may be configured to: determine that at least a part of the human body is hidden by another object, based on an aspect ratio of the bounding box being smaller than a predetermined reference aspect ratio, estimate a tiptoe coordinate of the human body from a coordinate value of the head area, and calculate a length of an entire body of the human body.

The processor may be configured to: estimate a result of adding Y coordinate value among center coordinate values of the bounding box including the head area to an integer multiple of a vertical length of the bounding box as a tiptoe coordinate of the human body, and the integer value of the integer multiple may be a value of adding the predetermined reference aspect ratio to a value considering a sensitivity of the surveillance camera.

The processor may be configured to: identify a gender of the detected human body, configure a two-dimensional center coordinate value based on a two-dimensional center coordinate value of the bounding box including the head area and a stature value of the human predetermined according to the gender and a three-dimensional coordinate value of the human body based on calibration information of the surveillance camera, acquire a three-dimensional coordinate value of a tiptoe from the three-dimensional coordinate value, and estimate a tiptoe coordinate of the human body by transforming the three-dimensional coordinate value of the tiptoe to a two-dimensional center coordinate value based on the calibration information of the surveillance camera.

An embodiment of the present disclosure may increase the reliability of an occlusion detection result without a large amount of database.

In addition, an embodiment of the present disclosure may correct coordinate information of a hidden object efficiently by using bounding box information that represents a detection object using a deep learning based occlusion detection result.

In addition, in the case that a hidden object is existed in the image of a surveillance camera, an occlusion of the object is determined, and the reference coordinate of the hidden object is estimated according to an embodiment of the present disclosure, and the entire length of the hidden object may be efficiently acquired.

In addition, an embodiment of the present disclosure may infer an actual distance between objects or an actual size of the object easily by utilizing object information, which is not hidden, in the case that a hidden object is existed in the image of a surveillance camera.

In addition, an embodiment of the present disclosure may correct an imperfect bounding box due to an objection occlusion and generate input data of a precise deep learning object detection algorithm, and accordingly, raise the reliability of the deep learning object detection.

The effects to be achieved by the present disclosure are not limited to the above-mentioned effects, and other effects not mentioned may be clearly understood by those skilled in the art from the following description.

BRIEF DESCRIPTION OF DRAWINGS

The accompanying drawings, which are included as part of the detailed description to help the understanding of the present disclosure, provide embodiments of the present disclosure, and explain the technical features of the present disclosure together with the detailed description.

FIGS. 7A and 7B illustrate an example that an object detection result is shown by a bounding box according to an embodiment of the present disclosure.

FIG. 8 is a flowchart of estimating a tiptoe coordinate of a human by using an aspect ratio of a bounding box according to an embodiment of the present disclosure.

DETAILED DESCRIPTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Figure 1:
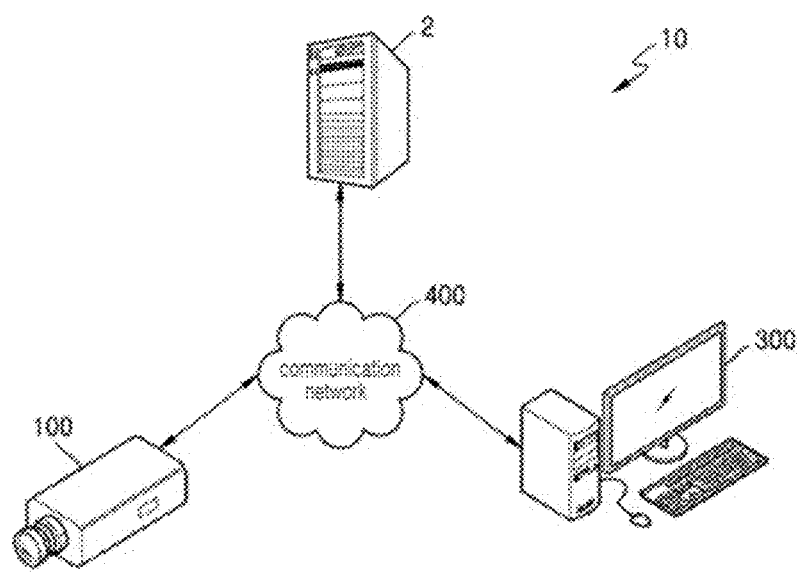
FIG. 1 is a diagram illustrating a surveillance camera system for implementing a surveillance camera controlling method according to an embodiment of the present disclosure.

FIG. 1 is a diagram illustrating a surveillance camera system for implementing a surveillance camera controlling method according to an embodiment of the present disclosure.

Referring to FIG. 1, a surveillance camera system 10 according to one embodiment of the present disclosure may include an image capture device 100 and an image management server 2. The image capture device 100 may be an electronic imaging device disposed at a fixed location in a specific place, may be an electronic imaging device that can be moved automatically or manually along a predetermined path, or may be an electronic imaging device that can be moved by a person or a robot. The image capture device 100 may be an IP (Internet protocol) camera connected to the wired/wireless Internet and used. The image capture device 100 may be a PTZ (pan-tilt-zoom) camera having pan, tilt, and zoom functions. The image capture device 100 may have a function of recording a monitored area or taking a picture. The image capture device 100 may have a function of recording a sound generated in a monitored area. When a change such as movement or sound occurs in the monitored area, the image capture device 100 may have a function of generating a notification or recording or photographing. The image capture device 100 may receive and store the trained object recognition learning model from the image management server 2. Accordingly, the image capture device 100 may perform an object recognition operation using the object recognition learning model.

The image management server 2 may be a device that receives and stores an image as it is captured by the image capture device 100 and/or an image obtained by editing the image. The image management server 2 may analyze the received image to correspond to the purpose. For example, the image management server 2 may detect an object in the image using an object detection algorithm. An AI-based algorithm may be applied to the object detection algorithm, and an object may be detected by applying a pre-trained artificial neural network mode.

In addition, the image management server 2 may analyze the received image to generate metadata and index information for the corresponding metadata. The image management server 2 may analyze image information and/or sound information included in the received image together or separately to generate metadata and index information for the metadata.

The surveillance camera system 10 may further include an external device 300 capable of performing wired/wireless communication with the image capture device 100 and/or the image management server 2.

The external device 300 may transmit an information provision request signal for requesting to provide all or part of an image to the image management server 2. The external device 300 may transmit an information provision request signal to the image management server 2 to request whether or not an object exists as the image analysis result. In addition, the external device 300 may transmit, to the image management server 2, metadata obtained by analyzing an image and/or an information provision request signal for requesting index information for the metadata.

The surveillance camera system 10 may further include a communication network 400 that is a wired/wireless communication path between the image capture device 100, the image management server 2, and/or the external device 300. The communication network 400 may include, for example, a wired network such as LANs (Local Area Networks), WANs (Wide Area Networks), MANs (Metropolitan Area Networks), ISDNs (Integrated Service Digital Networks), and a wireless network such as wireless LANs, CDMA, Bluetooth, and satellite communication, but the scope of the present disclosure is not limited thereto.

Figure 2:
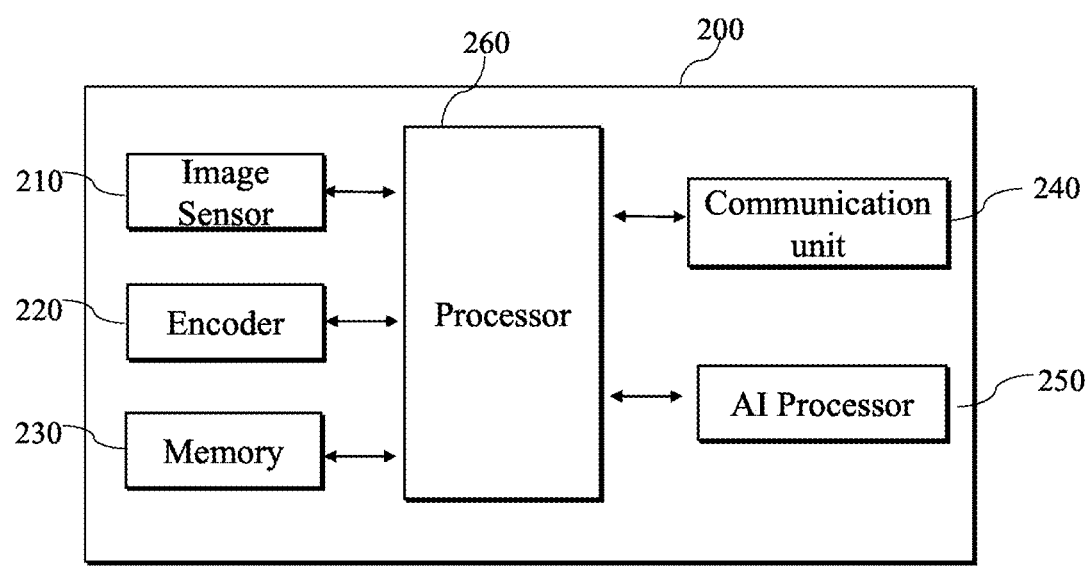
FIG. 2 is a block diagram illustrating a surveillance camera according to an embodiment of the present disclosure.

FIG. 2 is a block diagram illustrating a surveillance camera according to an embodiment of the present disclosure.

FIG. 2 is a block diagram illustrating a configuration of the camera shown in FIG. 1. Referring to FIG. 2, as an example, a camera 200 is a network camera that performs an intelligent image analysis function and generates a signal of the image analysis, but the operation of the network surveillance camera system according to an embodiment of the present disclosure is not limited thereto.

The camera 200 includes an image sensor 210, an encoder 220, a memory 230, a communication interface 240, AI processor 250, a processor 260.

The image sensor 210 performs a function of acquiring a image by photographing a surveillance region, and may be implemented with, for example, a CCD (Charge-Coupled Device) sensor, a CMOS (Complementary Metal-Oxide-Semiconductor) sensor, and the like.

The encoder 220 performs an operation of encoding the image acquired through the image sensor 210 into a digital signal, based on, for example, H.264, H.265, MPEG (Moving Picture Experts Group), M-JPEG (Motion Joint Photographic Experts Group) standards or the like.

The memory 230 may store image data, audio data, still images, metadata, and the like. As mentioned above, the metadata may be text-based data including object detection information (movement, sound, intrusion into a designated area, etc.) and object identification information (person, car, face, hat, clothes, etc.) photographed in the surveillance region, and a detected location information (coordinates, size, etc.).

In addition, the still image is generated together with the text-based metadata and stored in the memory 230, and may be generated by capturing image information for a specific analysis region among the image analysis information. For example, the still image may be implemented as a JPEG image file.

For example, the still image may be generated by cropping a specific region of the image data determined to be an identifiable object among the image data of the surveillance area detected for a specific region and a specific period, and may be transmitted in real time together with the text-based metadata.

The communication unit 240 transmits the image data, audio data, still image, and/or metadata to the image receiving/searching device 300. The communication unit 240 according to an embodiment may transmit image data, audio data, still images, and/or metadata to the image receiving device 300 in real time. The communication interface 250 may perform at least one communication function among wired and wireless LAN (Local Area Network), Wi-Fi, ZigBee, Bluetooth, and Near Field Communication.

The AI processor 250 is designed for an artificial intelligence image processing and applies a deep learning based object detection algorithm which is learned in the image acquired through the surveillance camera system according to an embodiment of the present disclosure. The AI processor 250 may be implemented as an integral module with the processor 260 that controls the overall system or an independent module. According to the embodiments of the present disclosure, a YOLO (You Only Lock Once) algorithm may be applied for an object recognition. YOLO is an AI algorithm proper for the surveillance camera that processes a image in real time due to the fast object detection speed. Different from the other object based algorithms (Faster R-CNN, R_FCN, FPN-FRCN, etc.), the YOLO algorithm outputs a classification probability of a bounding box object which indicates a position of each object by interpreting the result of passing through a single neural network only once after resizing a sheet of input image. Finally, the YOLO algorithm detects a single object once through a non-max suppression.

Meanwhile, the object detection algorithm disclosed in the present disclosure is not limited to YOLO described above, but may be implemented with various deep learning algorithms.

Figure 3:
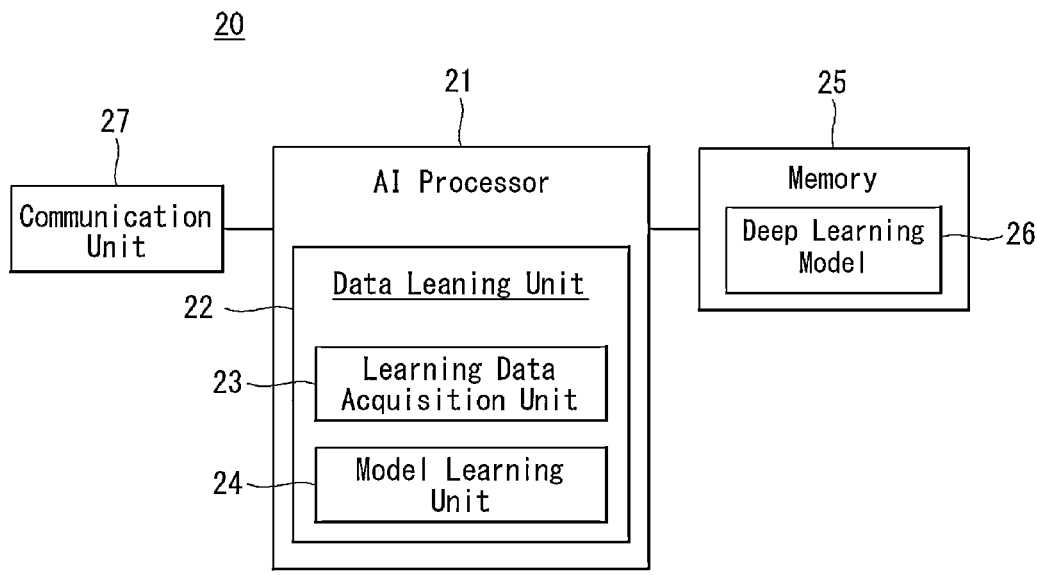
FIG. 3 is a diagram for explaining an AI (artificial intelligence) device (module) applied to training of the object recognition model according to one embodiment of the present disclosure.

FIG. 3 is a diagram for explaining an AI (artificial intelligence) device (module) applied to training of the object recognition model according to one embodiment of the present disclosure.

Embodiments of the present disclosure may be implemented through a computing device for training a model for object recognition, and the computing device may include the image management server 2 (see FIG. 1) described in FIG. 1, but the present disclosure is not limited thereto, and a dedicated device for training an AI model for recognizing an object in an image may also be included. The dedicated device may be implemented in the form of a software module or hardware module executed by a processor, or in the form of a combination of a software module and a hardware module.

Hereinafter, the dedicated AI device 20 for implementing the object recognition learning model will be described in FIG. 2, and a block configuration for implementing an object recognition learning model according to one embodiment of the present disclosure in the image management server 2 (see FIG. 1) will be described in FIG. 3. All or at least some of the functions common to the model training function described in FIG. 2 may be directly applied to FIG. 3, and in describing FIG. 3, redundant descriptions of functions common to FIG. 2 will be omitted.

Referring to FIG. 3, the AI device 20 may include an electronic device including an AI module capable of performing AI processing, or a server including an AI module. In addition, the AI device 20 may be included the image capture device 100 or the image management server 2 as at least a part thereof to perform at least a part of AI processing together.

The AI processing may include all operations related to a control unit of the image capture device 100 or the image management server 2. For example, the image capture device 100 or the image management server 2 may AI-process the obtained image signal to perform processing/determination and control signal generation operations.

The AI device 20 may be a client device that directly uses the AI processing result or a device in a cloud environment that provides the AI processing result to other devices. The AI device 20 is a computing device capable of learning a neural network, and may be implemented in various electronic devices such as a server, a desktop PC, a notebook PC, and a tablet PC.

The AI device 20 may include an AI processor 21, a memory 25, and/or a communication unit 27.

Here, the neural network for recognizing data related to image capture device (100) may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When the neural network model is trained, the model training unit 24 may store the trained neural network model in a memory. The model training unit 24 may store the trained neural network model in the memory of the server connected to the AI device 20 through a wired or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 may transmit the AI processing result of the AI processor 21 to an external electronic device. For example, the external electronic device may include a surveillance camera, a Bluetooth device, an autonomous vehicle, a robot, a drone, an AR (augmented reality) device, a mobile device, a home appliance, and the like.

Meanwhile, the AI device 20 shown in FIG. 2 has been functionally divided into the AI processor 21, the memory 25, the communication unit 27, and the like, but the above-described components are integrated as one module and it may also be called an AI module.

In the present disclosure, at least one of a surveillance camera, an autonomous vehicle, a user terminal, and a server may be linked to an AI module, a robot, an augmented reality (AR) device, a virtual reality (VR) device, a device related to a 5G service, and the like.

Figure 4:
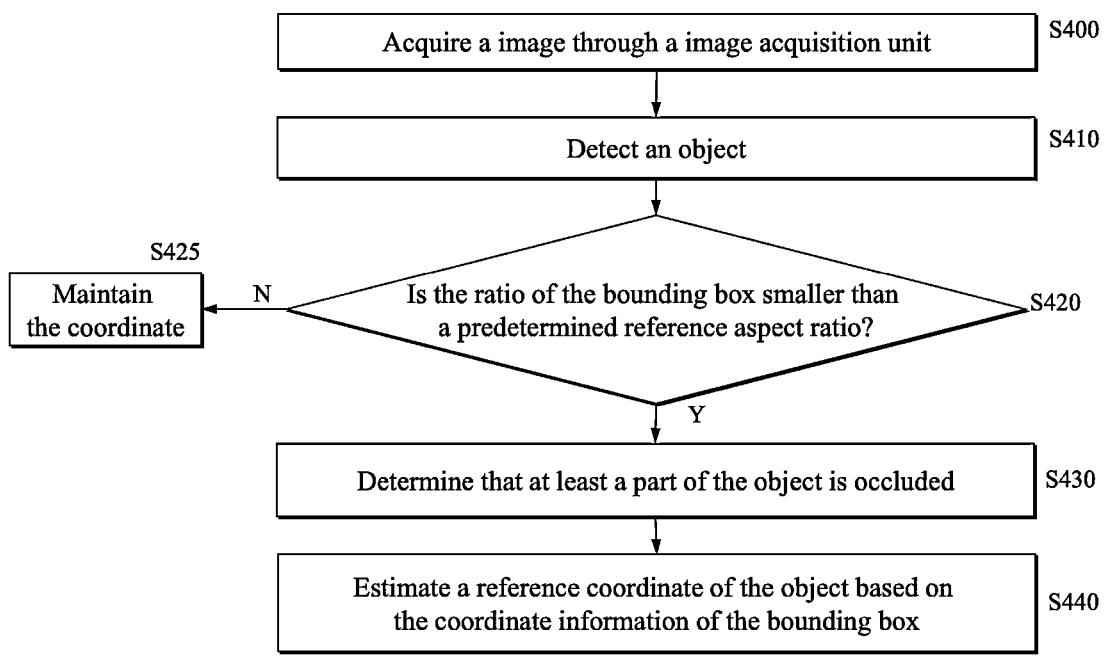
FIG. 4 is a flowchart of a controlling method of a image processing apparatus according to an embodiment of the present disclosure.
Figure 5:
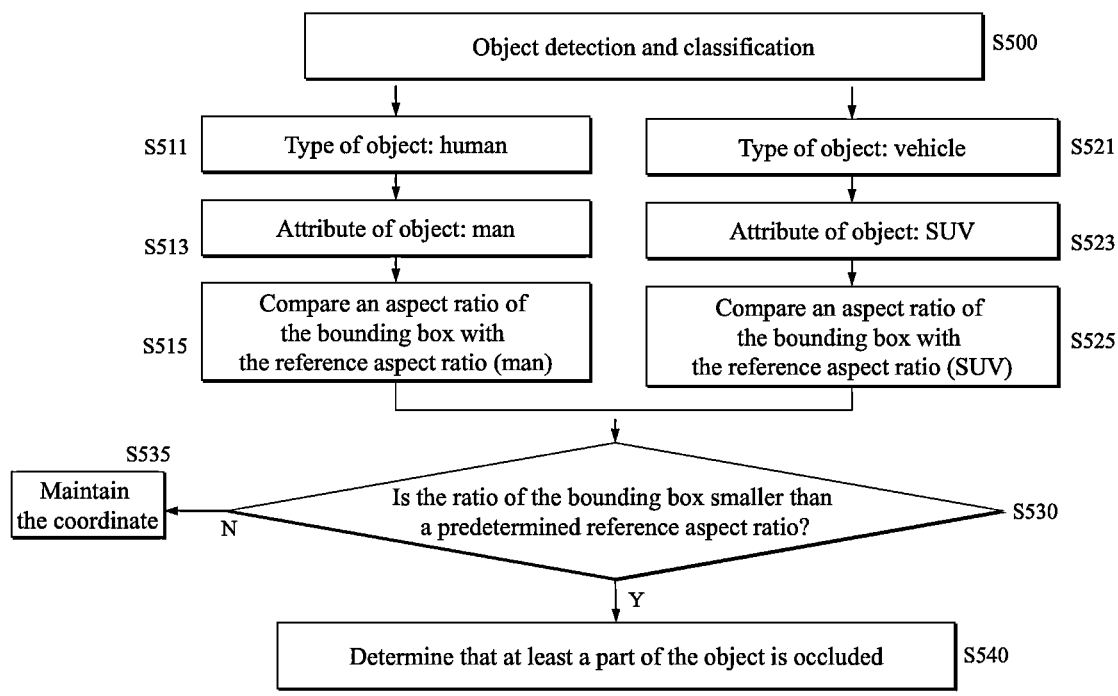
FIG. 5 is a flowchart illustrating an example of differently applying a reference aspect ratio according to a type and an attribute of an object according to an embodiment of the present disclosure.

FIG. 4 is a flowchart of a controlling method of a image processing apparatus according to an embodiment of the present disclosure. FIG. 5 is a flowchart illustrating an example of differently applying a reference aspect ratio according to a type and an attribute of an object according to an embodiment of the present disclosure.

For the convenience of description, the surveillance camera 200 shown in FIG. 2 is described as an example of the image processing apparatus, but the apparatus to which the present disclosure is applied may be applied to all types of image processing apparatuses having a camera function including the surveillance camera.

The processor 260 may acquire a image through a image acquisition unit (step S400). The image acquisition unit may include a image acquisition unit of the surveillance camera and a image acquisition unit installed on an automotive driving vehicle.

The processor 260 may detect an object from the image acquired through the image acquisition unit (step S410). The processor 260 may detect an object by using a deep learning algorithm for an object detection. A type of the detected object is not limited, and may include a human, an animal, a vehicle, and the like.

The processor 260 may show a bounding box that indicates an object detection result on the detected object. The bounding box may have a predetermined aspect ratio. The processor 260 may compare the ratio of the bounding box with a predetermined reference aspect ratio (step S420).

Here, the reference aspect ratio may have different value depending on at least one of a type or an attribute of the object. For example, in the case that a type of the object is a human, the reference aspect ratio may be changed depending on the gender. That is, the reference aspect ratio of a man and the reference aspect ratio of a woman may be different. The reference aspect ratio may be a preset value, and the reference aspect ratios may be updated depending on an average stature value of a man or a woman.

In the case that the processor 260 determines that the ratio of the bounding box is smaller than the reference aspect ratio of the object (step S420: Y), the processor 260 may determine that at least a part of the object is occluded (step S430). In the case that the processor 260 determines that an occlusion object is detected, the processor 260 may perform the process of correcting a coordinate value of the bounding box of the occlusion object and estimating a size of the bounding box of the object before being occluded.

Here, the reference aspect ratio is set as an average value depending on a type and an attribute of the object, and even in the case that an occlusion of the object is not really existed, there may be a difference in size between the aspect ratio of the bounding box of the object and the reference aspect ratio within a predetermined error range. Even in the case that the processor 260 determines that the aspect ratio of the bounding box of the object is smaller than the reference aspect ratio, the processor 260 may store the object information in which the object occlusion is not existed separately in a memory. The object information stored in the memory may be used in a learning process of an object occlusion determination model later.

In the case that the processor 260 determines that the aspect ratio of the bounding box of the object is not smaller than the reference aspect ratio, the processor 260 may maintain the coordinate information of the bounding box of the detected object without any change (step S425).

The processor 260 may estimate a reference coordinate of the object based on the coordinate information of the bounding box of the object (step S440).

Here, the reference coordinate may mean a coordinate for estimating a length of the object which is before being occluded in the state in which at least a part of the object is occluded. More specifically, the reference coordinate may mean coordinate information of at least one point between both ends in a length direction of the object which is before being occluded. According to an embodiment, in the case that a part of the body of a person behind (a body except a head area) is hidden by a person ahead, a tiptoe coordinate extracted by comparing the entire body stature of the person behind may become a reference coordinate. Alternatively, according to an embodiment, in the case that a part of a vehicle (a front end of a vehicle) is occluded, an end part of the vehicle may be used as a reference coordinate.

The example in which different reference aspect ratios are applied depending on a type and an attribute of the object is described in more detail with reference to FIG. 5.

Referring to FIG. 5, the processor 260 may detect an object in the image acquired through the image acquisition unit and perform a classification operation of the detected object (step S500). Here, a type of the object may include at least one of a human, an animal, or a vehicle. In addition, it is understood that an attribute of the object includes a feature which may be classified with different categories among the objects of the same type. Meanwhile, the "type of the object" or the "attribute of the object" is a term defined for the convenience of description, and may also be applied to any object classification name of a first type of object which is classifiable among a plurality of different attributes after classified into a type of a specific object. For example, after a type of the object is determined to be a human (a type of object) through a deep learning object detection algorithm, the deep learning object detection algorithm may classify a gender of the human (corresponding to an attribute of the object if a type of the object is a hump) additionally. Furthermore, for example, after a type of the object is determined to be a vehicle (a type of object) through a deep learning object detection algorithm, the deep learning object detection algorithm may classify the vehicle to an SUV, a sedan, a truck, a compact car, and the like (corresponding to an attribute of the object if a type of the object is a vehicle) additionally.

Meanwhile, after a type of the object is determined, a depth of the object attribute which is additionally classifiable may be transformed into various forms. In one example, in the case that an attribute of the object is a man, an additional attribution classification may be available based on an age group (for example, age information, etc.).

Meanwhile, the image processing apparatus according to an embodiment of the present disclosure may store different reference aspect ratios in a memory according to the classified type and attribute of the object, and the processor 260 may apply the different reference aspect ratios depending on the detected object and determine an occlusion of the object.

The processor 260 may determine a type of the object into a human (step S511), and in the case that the object attribute (gender) is determined to be a man (step S513), the processor 260 may compare the reference aspect ratio of a man stored in the memory with an aspect ratio of the bounding box of the detected object (step S515).

The processor 260 may determine a type of the object into a vehicle (step S521), and in the case that the object attribute is determined to be an SUV (step S523), the processor 260 may compare the reference aspect ratio of an SUV vehicle stored in the memory with an aspect ratio of the bounding box of the detected object (step S525).

Meanwhile, the embodiment described above describes the case in which both of a type and an attribute of the object are determined, and the corresponding reference aspect ratio is applied, but the present disclosure is not limited thereto. For example, in the case that only a reference aspect ratio according to a type of the object is stored in a memory and a reference aspect ratio according to a detailed attribute of the object is not present, the processor 260 also classifies the attribute of the object, but may also determine an occlusion of the object by comparing the reference aspect ratio according to the classified type of the object with the aspect ratio of the bounding box.

In the case that the aspect ratio of the actual bounding box of the detected object is smaller than the reference aspect ratio based on the type and/or attribute of the object (step S530: Y), the processor 260 may determine that an occlusion occurs on at least a part of the object (step S540).

In the case that the aspect ratio of the actual bounding box of the detected object is not smaller than the reference aspect ratio based on the type and/or attribute of the object (step S530: N), the processor 260 may maintain the coordinate information of the actual bounding box and determine a distance between objects based on the coordinate information later.

Figure 6:
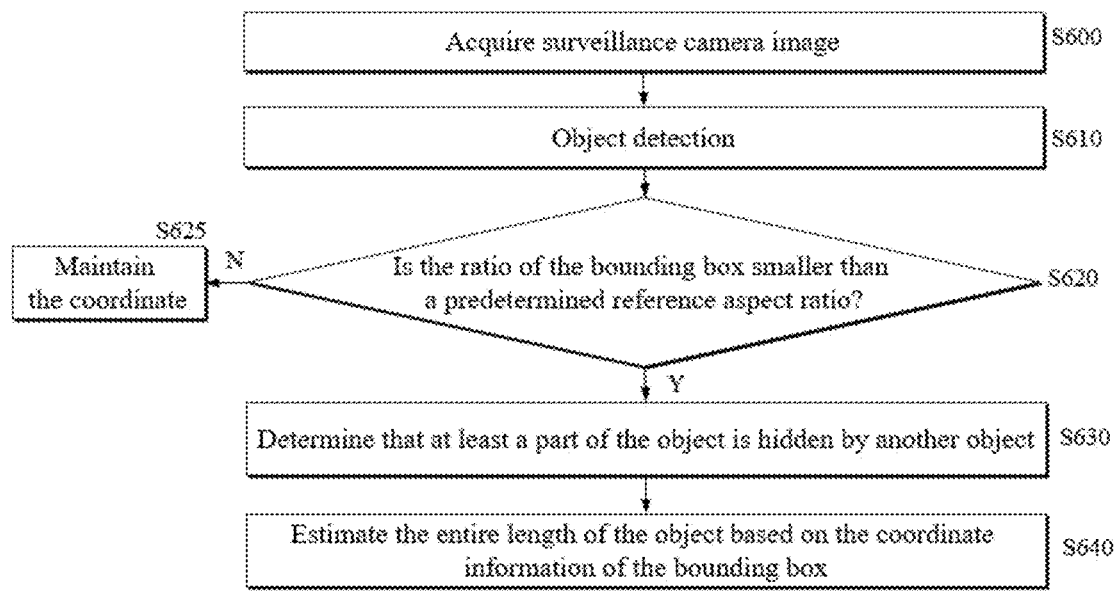
FIG. 6 is a flowchart of a image processing method of a surveillance camera according to an embodiment of the present disclosure.

FIG. 6 is a flowchart of a image processing method of a surveillance camera according to an embodiment of the present disclosure. The image processing method shown in FIG. 6 may be implemented by the surveillance camera system, the surveillance camera device, or the processor or the controller included in the surveillance camera device described with reference to FIG. 1 to FIG. 3. For the convenience of description, the image processing method is described on the premise that various functions may be controlled through the processor 260 of the surveillance camera shown in FIG. 2, but the present disclosure is not limited thereto.

Referring to FIG. 6, the surveillance camera 200 acquires a surveillance camera image (step S600). The acquired image may include at least one object, and a controlling method of a surveillance camera according to an embodiment of the present disclosure may be utilized to infer a size of the object included in the image, a distance between the objects, and the like.

The surveillance camera 200 may detect an object in the acquired image (step S610). The processor 260 may detect an entire body, a head, a face, and the like of a human by using the object detection technique based on AI from the image. According to an embodiment, the object is classified in the acquired image by applying a deep learning based YOLO (You Only Look Once) algorithm and display a bounding box for indicating an object detection result for the classified object along an edge of the detected object.

Referring to FIG. 7A, when a human 501 is detected in the image acquired from the surveillance camera, two types of bounding boxes, for example, a first bounding box 502 corresponding to a head area and a second bounding box 503 corresponding to an entire body length may be shown.

Meanwhile, referring to FIG. 7B, a second object 520 is located behind a first object 510 in the image acquired from the surveillance camera, at least a part of the second object 520 may be hidden by the first object 510. In this case, the processor 260 may show a first bounding box 511 and a second bounding box 521 for the first object 510 and the second 520, respectively. However, the second bounding box 521 may not include the length of the entire body. Accordingly, the vertical length of the second bounding box 521 may be represented in short. In this case, the processor 260 may not utilize accurate size information of the second object 520. Accordingly, in the case that the size information of the bounding box exceeds a predetermined range, according to an embodiment of the present disclosure, it is determined that the length of the entire object is not included, and further, it is regarded that the object is hidden by another object.

Referring to FIG. 6 again, the processor 260 may compare the aspect ratio of the bounding box with a predetermined reference aspect ratio (step S620).

The aspect ratio of the bounding box may mean a ratio of a horizontal length to a vertical length of the bounding box. The predetermined reference aspect ratio is designed to be compared with a size of the bounding box shown as an object detection result and may be determined depending on an installation angle of the surveillance camera. For example, the aspect ratio of the bounding box for detecting the entire body of the same person may be different depending on the installation angle of the surveillance camera. The installation angle of the surveillance camera may mean an angle when only a front end portion on which a camera lens is located is moved upwardly or downwardly in the state in which a position of the surveillance camera is fixed. In the case that the surveillance camera is headed downwardly, the body length of a person acquired from the image may be relatively shorter. On the other hand, in the case that the surveillance camera is located closer to a front side, the body length of a person acquired from the image may be relatively longer. Accordingly, the reference aspect ratio depending on the installation angle of the surveillance camera may be calculated by the following equation.

$$\text{Reference aspect ratio} = k \times \log(\text{tilt}) + b \qquad \text{[Equation 1]}$$

Here, tilt is an installation angle of a CCTV camera, and k and b are arbitrary real numbers.

In the case that the aspect ratio of the bounding box is shorter than the reference aspect ratio as a consequence of the aspect ratio comparison, the processor 260 may determine that the object detected in the image is hidden by another object (step S630). That is, the state in which the object detected in the image is hidden by another object may be determined through the aspect ratio comparison efficiently, not by a complex image analysis consequence, and the resource of the surveillance camera may be saved, and the occlusion of the object may be determined.

The processor 260 may correct the coordinate information of the detected object and infer the entire length of the object hidden by another object. According to an embodiment, the processor 260 may estimate the entire length of the object by correcting the coordinate information of the object based on the coordinate information of the bounding box (step S640).

In the case that the aspect ratio of the bounding box is not shorter than the reference aspect ratio, the processor 260 may determine that the object in the image is not hidden by another object and maintain the coordinate information of the object (step S625).

Hereinafter, with reference to FIG. 8 and FIG. 9, the process is described in more detail, which corrects the coordinate of the detected object and infers the entire length of the hidden object by using the coordinate information of the bounding box.

Referring to FIG. 8, in the case that the processor 260 determines that the object is hidden in the surveillance camera image, the processor 260 may determine that the bounding box includes only a head area of a body (step S800). The deep learning based object detection algorithm applied in an embodiment of the present disclosure may be a model trained to detect an entire body of a human, a head area of a human, when a human is detected. Accordingly, in the case that the deep learning based object detection algorithm determines that the image does not include an entire body of a human, only the head area of the human may be detected. However, the object detection method is not limited to the example described above, but may be embodied in various modifications.

The processor 260 may estimate a tiptoe coordinate of the body by using a coordinate of the bound box and a vertical length of the bounding box (step S810). To measure a distance between persons in the image of the surveillance camera, it is general to measure a distance between ground points of the detected persons, and accordingly, it is required to acquire a ground coordinate of each detected person, that is, a tiptoe coordinate of each person.

Figure 9:
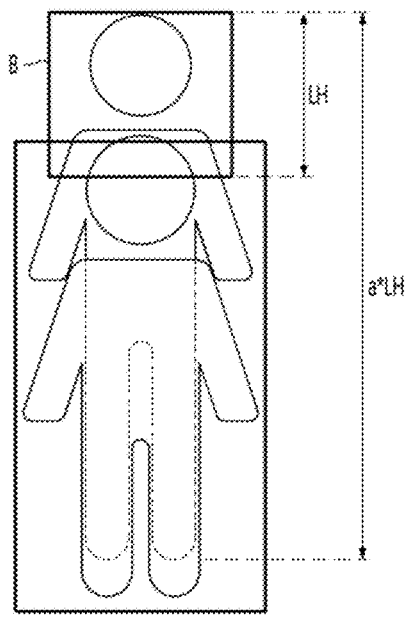
FIG. 9 is a diagram for describing the flowchart shown in FIG. 8.

Referring to FIG. 9, according to an embodiment of the present disclosure, a method of estimating tiptoe coordinate information of a hidden object (human body) is applied.

The processor 260 may calculate the tiptoe coordinate of the object by using coordinate information of the bounding box B of the hidden object, and the tiptoe coordinate may be based on stature information of a human.

The processor 260 may infer a stature of the human in a two-dimensional image coordinate system by using the bounding box B that corresponds to a head area. Specifically, in the two-dimensional image coordinate system, a stature of a human may be "a" times of a vertical length LH of the bounding box B. In the case that a distance between the surveillance camera and the object is sufficiently long according to the installation specification of the surveillance camera, the correlation between a head length and the stature of the human may be sufficiently dependent on the installation angle (Tilt) value of the surveillance camera. Accordingly, the estimated stature of the human may be defined as K of the head length of the human (K is a real number). In this case, K is defined as a reference aspect ratio of the surveillance camera+α, and the reference aspect ratio is a function of the installation angle (Tilt) of the surveillance camera as a factor. Here, the value α may be a value that correspond to a sensitivity of the surveillance camera function.

The processor 260 may sum up the stature of the human calculated in the two-dimensional image coordinate system and a center coordinate value of the top of the bounding box and calculate the tiptoe coordinate of the human. The tiptoe coordinate of the human may be represented by the following equation.

$$(x_{foot}, y_{foot}) = (x_{top}, y_{top}) + (0, a \cdot \text{length}_{head}) \quad \text{[Equation 2]}$$

Herein, $x_{foot}$: x coordinate of the tiptoe coordinate of the human in the two-dimensional image coordinate system $y_{foot}$: y coordinate of the tiptoe coordinate of the human in the two-dimensional image coordinate system $x_{top}$: x coordinate of the top center the bounding box of detecting a human or a head in the two-dimensional image coordinate system $y_{top}$: y coordinate of the top center the bounding box of detecting a human or a head in the two-dimensional image coordinate system α: arbitrary real number $\text{length}_{head}$: vertical length of the bounding box of detecting a head in the two-dimensional image coordinate system So far, the tiptoe coordinate estimation method described in FIG. 8 and FIG. 9 assumes that a stature of a human may be defined as an arbitrary real number multiplication of a length of a head area of a human, and applies coordinate information of a bounding box to the assumption, and accordingly, infers the entire length of a hidden object. However, the method of estimating a tiptoe coordinate of a human is not limited to the examples described above in the present disclosure.

Figure 10:
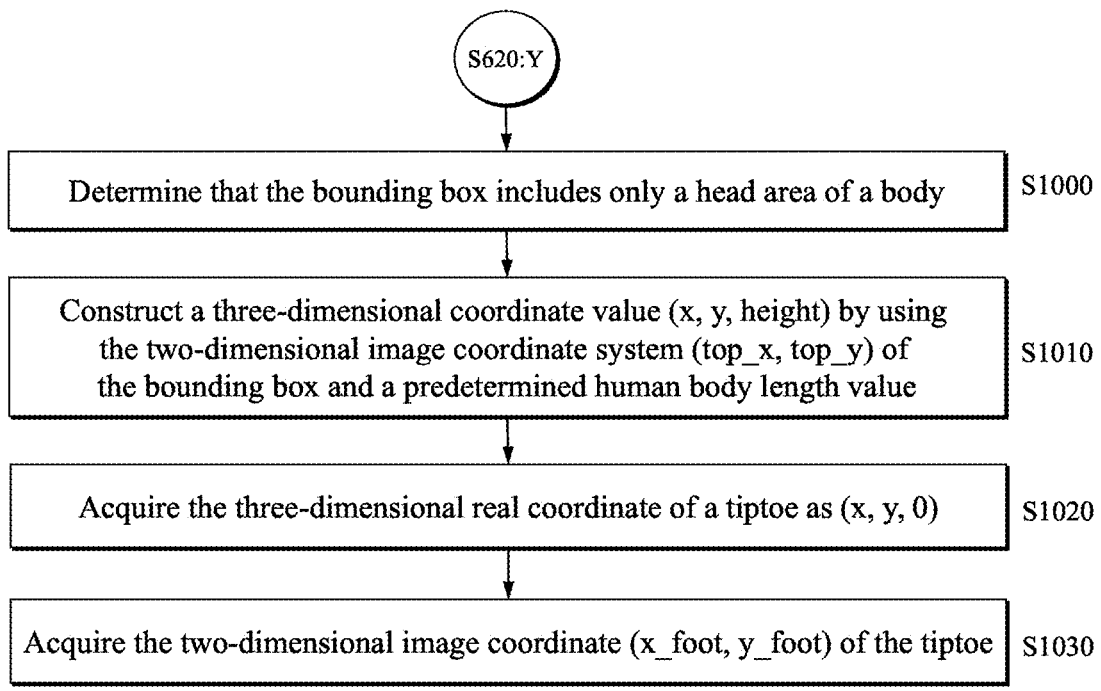
FIG. 10 is a flowchart of another example of estimating a tiptoe coordinate of a human by using an aspect ratio of a bounding box according to an embodiment of the present disclosure.

FIG. 10 is a flowchart of another example of estimating a tiptoe coordinate of a human by using an aspect ratio of a bounding box according to an embodiment of the present disclosure.

Referring to FIG. 10, as a consequence of the comparison between the aspect ratio of the bounding box of a surveillance camera image and a predetermined reference aspect ratio, in the case that a part of the object (human) included in the image is determined to be hidden by another object, the processor 260 may determine that the bounding box includes only a head area of the human body (step S1000).

According to an embodiment, in the present disclosure, a stature of a human may be inferred by using camera calibration information. The camera calibration may be a process of obtaining a relationship between the two-dimensional image coordinate system and the two-dimensional real coordinate system. A transform between the two-dimensional image coordinate system and the two-dimensional real coordinate system is available through the camera calibration.

The processor 260 may construct a three-dimensional coordinate value (x, y, height) by using the two-dimensional image coordinate system (top_x, top_y) of the bounding box and a predetermined human body length value (step S1010).

The relationship between the two-dimensional image coordinate system and the three-dimensional real coordinate may be represented by Equation 3 below.

$$\begin{pmatrix} \lambda u \\ \lambda v \\ \lambda \end{pmatrix} = P \begin{pmatrix} X \\ Y \\ Z \\ 1 \end{pmatrix} = K[R|T] \begin{pmatrix} X \\ Y \\ Z \\ 1 \end{pmatrix} \quad \text{[Equation 3]}$$

Herein,
two-dimensional image coordinate:

$$\begin{pmatrix} \lambda u \\ \lambda v \\ \lambda \end{pmatrix}$$

three-dimensional real coordinate:

$$\begin{pmatrix} X \\ Y \\ Z \\ 1 \end{pmatrix}$$

P: internal, external parameters of a camera, K: an internal parameter of a camera, and R, T: external parameters of a camera Therefore, when an actual stature of a human is 180 cm, it is possible to calculate the two-dimensional image coordinate on a point 180 cm out of a specific two-dimensional image coordinate. When the two-dimensional image coordinate of a top center of a bounding box of detecting a head area of a human is (top_x, top_y), the three-dimensional real coordinate of (top_x, top_y) may be assumed to be (x, y, 180 cm). In this case, the processor 260 may acquire the three-dimensional real coordinate of a tiptoe of the human as (x, y, 0) (step S1020), and the processor 260 may transform this value to the two-dimensional image coordinate by using the camera calibration information and acquire the two-dimensional image coordinate (x_foot, y_foot) of the tiptoe of the human (step S1030).

Meanwhile, the predetermined human body length value in step S1010 may be differently applied depending on a gender of a human. Accordingly, the processor 260 may detect an object and classify a gender of the object by using the deep learning based algorithm and differently apply the predetermined human body length value depending on whether the classified gender is a man or a woman. The applied human body length value may correspond to an average stature for each of a man and a woman.

The above-described examples are described for the case that the object is a human, but the present disclosure is no limited thereto. Hereinafter, the example to which the object occlusion determination is applied is described in the present disclosure in the case that an object is a vehicle.

FIGS. 11A-11D and FIGS. 12A-12B are diagrams illustrating an embodiment in which a controlling method of a image processing apparatus is applied to a vehicle according to an embodiment of the present disclosure.

Figure 11A:
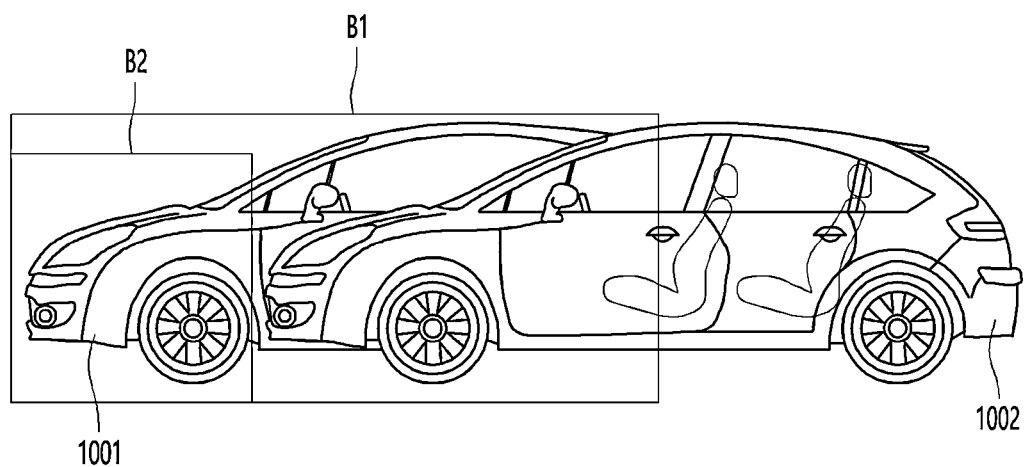
FIGS. 11A-11D and FIGS. 12A-12B are diagrams illustrating an embodiment in which a controlling method of a image processing apparatus is applied to a vehicle according to an embodiment of the present disclosure.
Figure 11B:
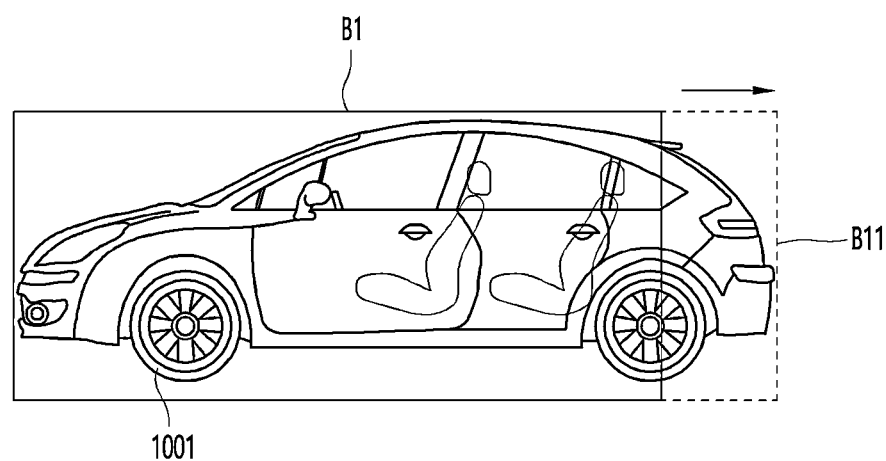

Referring to FIGS. 11A and 11B, the processor 260 may detect an object using the deep learning based object detection algorithm. Various detection model related to a vehicle detection is applied to the deep learning based object detection algorithm, and the deep learning based object detection algorithm may detect the entire vehicle, the front part of the vehicle, and a direction of the vehicle.

The processor 260 determines that a direction of the detected vehicle 1002 (a type of the object) is left, and the aspect ratio of the bounding box B1 of the entire vehicle is smaller than a predetermined reference aspect ratio (a predefined reference aspect ratio of the vehicle). In addition, in the case that a size of the bounding box B1 of the entire vehicle is a predetermined value or smaller, in comparison with a size of the bounding box B2 of the front part 1002, the processor 260 may determine that a rear part of the vehicle is occluded. That is, before the rear part of a first vehicle 1001 is occluded by the second vehicle 1002, a first ratio B11/B2 of the bounding box of the entire vehicle in comparison with the bounding box B2 of the front part of the vehicle may be compared with a second ratio B1/B2 of the bounding box of the entire vehicle in comparison with the bounding box B2 of the front part of the vehicle, in the state that a rear part of the first vehicle 1001 occluded by the second vehicle 1002. Accordingly, when the second ratio is smaller than the first ratio, the vehicle occlusion may be determined, and depending on whether the front part is detected, the front part or rear part occlusion may be additionally determined.

As shown in FIG. 11A, in the case that the processor 260 determines that the rear part of the vehicle is occluded, the processor 260 may adjust a right side coordinate value of a size B1 of the bounding box to a right side as much as the reference aspect ratio (FIG. 11B).

Figure 11C:
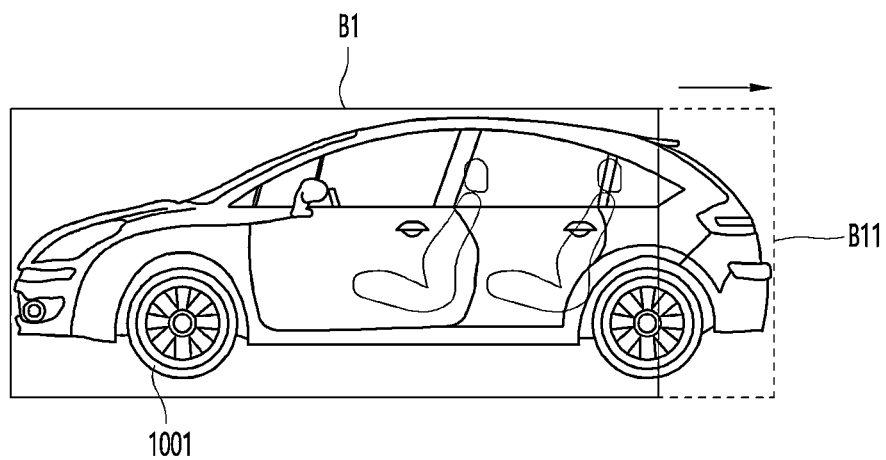
Figure 11D:
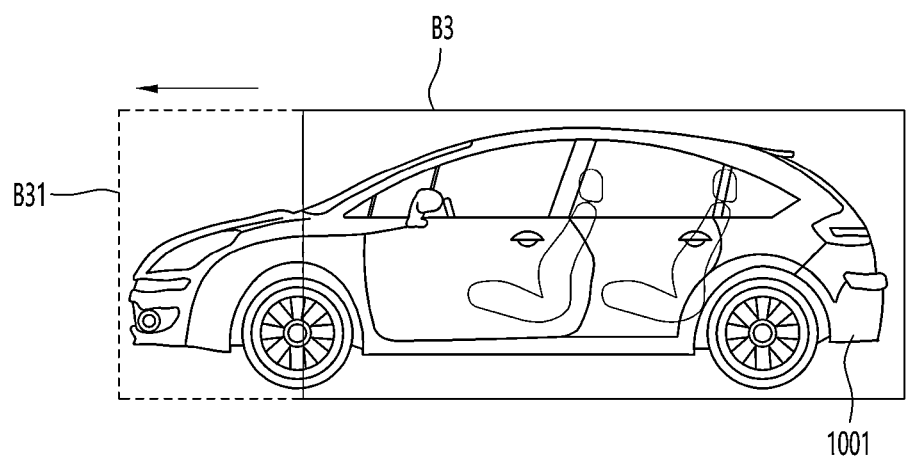

Referring to FIGS. 11C and 11D, the processor 260 determines that a direction of the detected vehicle is left, and the aspect ratio of the bounding box B3 of the entire vehicle is smaller than a predetermined reference aspect ratio, and the front part bonding box is not detected, the processor 260 may determine that the front part of the vehicle is occluded. Accordingly, the processor 260 may adjust (B31) a left side coordinate value of the bounding box B3 of the entire vehicle to a left side as much as the reference aspect ratio.

Meanwhile, as described with reference to FIGS. 11A to FIG. 11D, the deep learning based object detection algorithm may include a model in which a direction detection of a vehicle is available depending on the shapes of the front, rear, left, and right sides of the vehicle.

Referring to FIGS. 11A to FIG. 11D, the example has been described, in which the vehicle is detected using the image processing apparatus provided with a camera device installed at a similar height of the vehicle or the automotive driving vehicle, the occlusion is determined, and the coordinate correction is performed. However, the present disclosure is not limited thereto. For example, the image processing apparatus or the surveillance camera may be installed at a position of more than a predetermined height and monitor a surveillance target object located below the position.

Figure 12A:
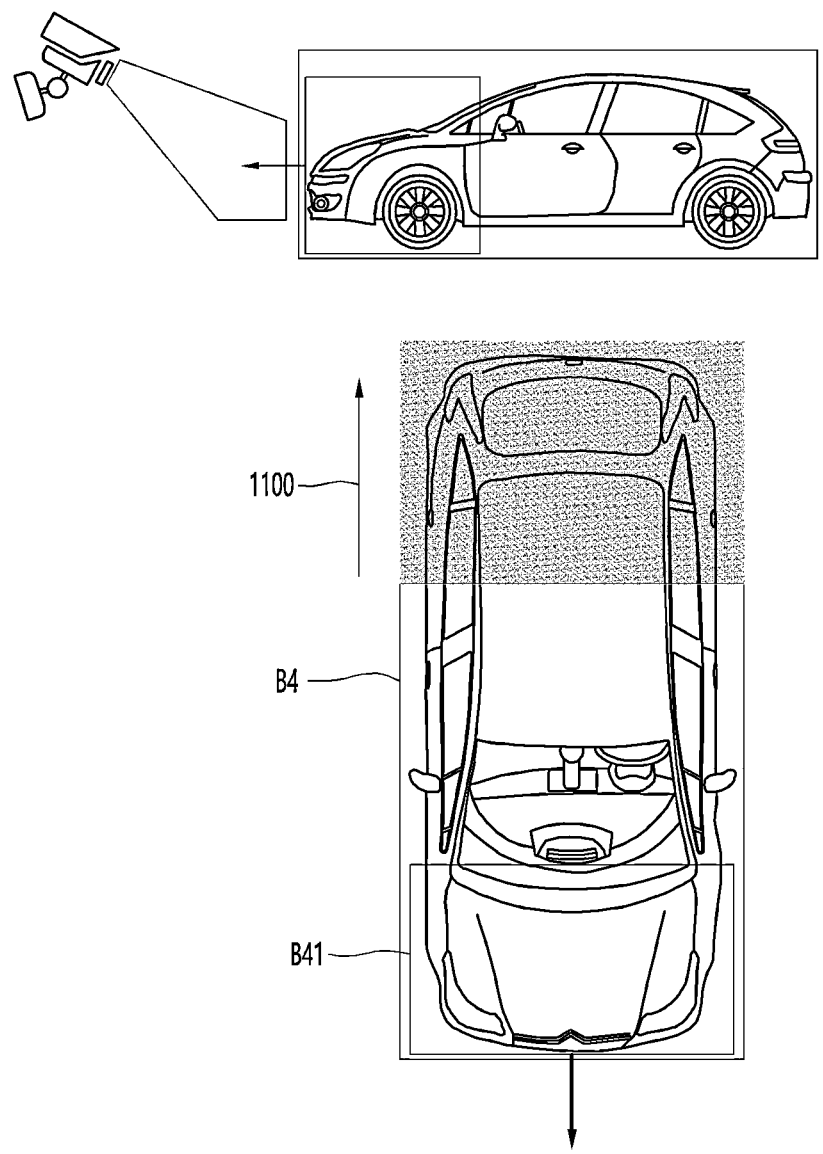

Referring to FIG. 12A, it is described the embodiment that a surveillance camera (CCTV) detects that a surveillance target vehicle located below moves forward to the surveillance camera.

In the case that the direction of the vehicle is a downward direction (the vehicle moves to the surveillance camera based on FIG. 12A), the aspect ratio of the bounding box B4 of the entire vehicle is a predetermined value or smaller, and the size of the bounding box of the entire vehicle is a predetermined value or smaller in comparison with the size of the bounding box B41 of the front side, the processor 260 may determine that the rear side of the vehicle is occluded. Accordingly, the processor 260 may adjust an upper side coordinate value of the bounding box B4 of the entire vehicle to an upper direction as much as the reference aspect ratio.

Figure 12B:
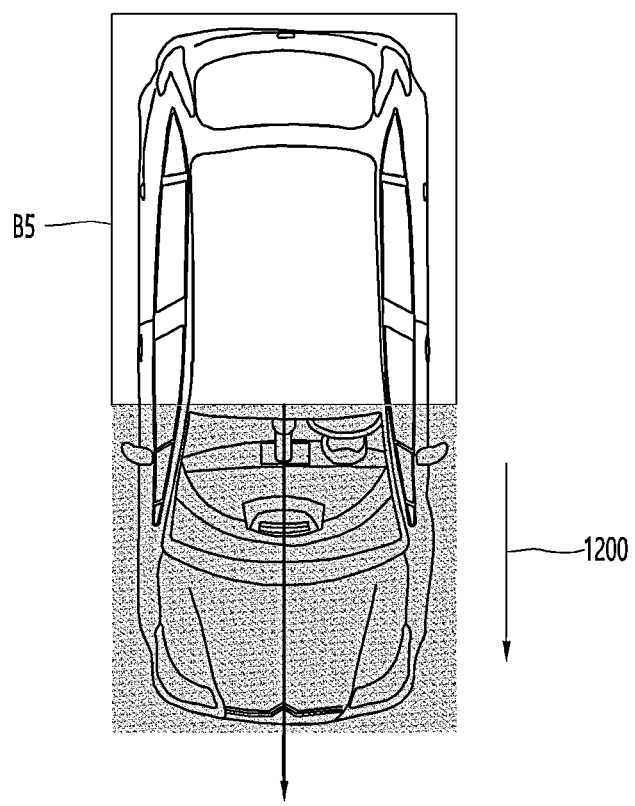

Referring to FIG. 12B, in the case that the direction of the vehicle is an upward direction, the aspect ratio of the bounding box B5 of the entire vehicle is a predetermined value or smaller, and the bounding box of the front side is not detected, the processor 260 may determine that the front side of the vehicle is occluded. Accordingly, the processor 260 may adjust a lower side coordinate value of the bounding box of the entire vehicle to a lower direction as much as the reference aspect ratio.

Figure 13:
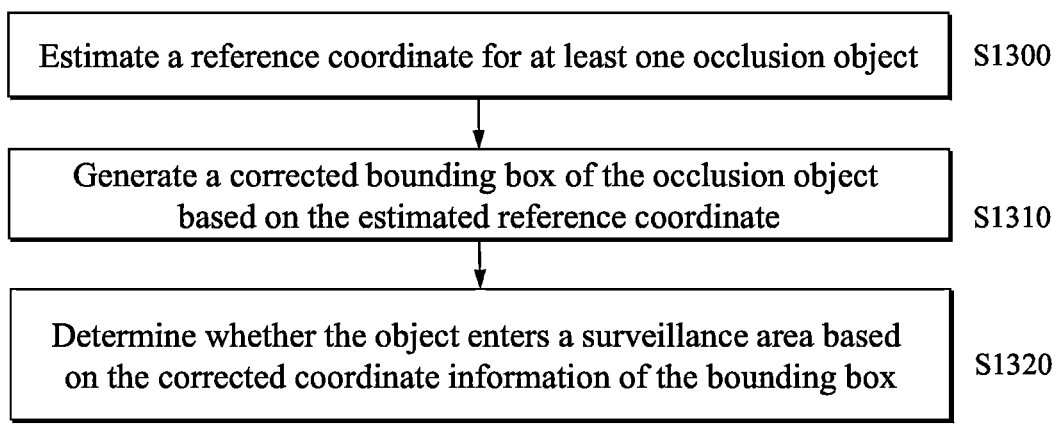
FIG. 13 is a flowchart illustrating an embodiment in which the controlling method of a image processing apparatus according to an embodiment of the present disclosure is applied to determine an entrance to a surveillance area.
Figure 14A:
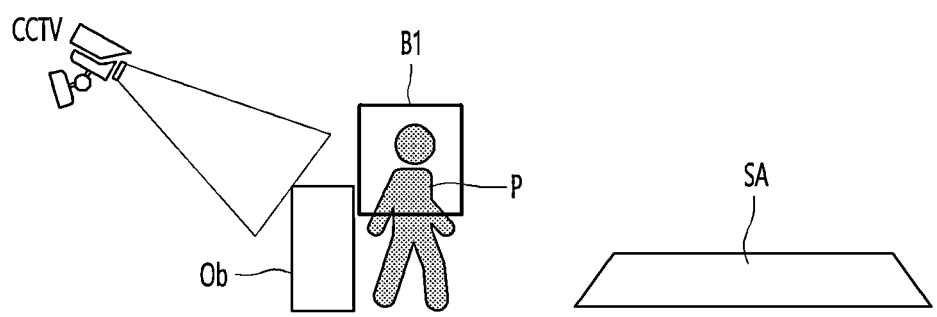
FIGS. 14A and 14B are diagrams for describing the embodiment shown in FIG. 13 in detail.
Figure 14B:
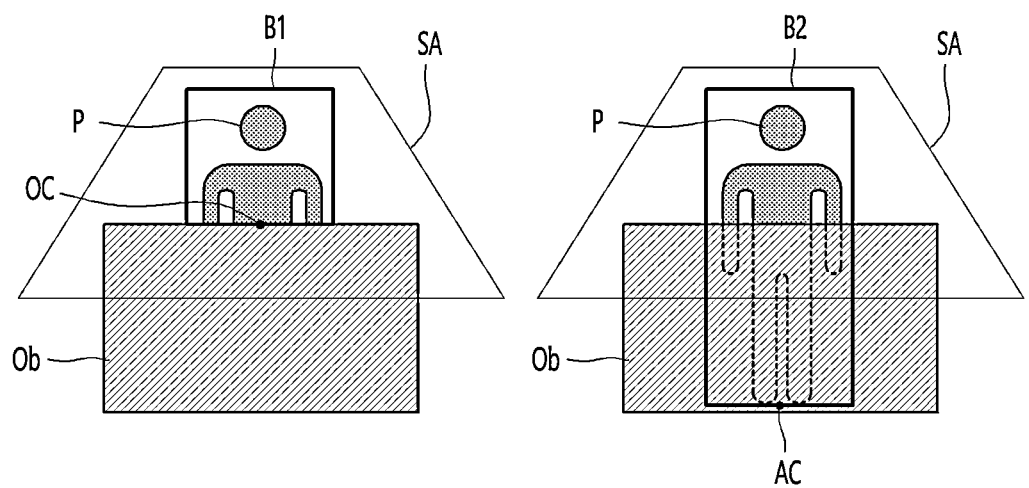

FIG. 13 is a flowchart illustrating an embodiment in which the controlling method of a image processing apparatus according to an embodiment of the present disclosure is applied to determine an entrance to a surveillance area. FIGS. 14A and 14B are diagrams for describing the embodiment shown in FIG. 13 in detail.

Referring to FIG. 13, the processor 260 may estimate a reference coordinate for at least one occlusion object (step S1300). The method of the embodiments described above may be identically applied to the object detection and the object classification operations.

The processor 260 may generate a corrected bounding box of the occlusion object based on the estimated reference coordinate (step S1310).

The processor 260 may determine whether the object enters a surveillance area based on the corrected coordinate information of the bounding box (step S1320).

Referring to FIG. 14A, a surveillance camera (CCTV) may monitor whether an object P in a lower direction enters a surveillance area SA. However, when an obstacle Ob is present near to the object P, the image acquired by the surveillance camera may be determined that a part of the object B1 is occluded, as shown in FIG. 14(b).

Referring to FIG. 14B, in the case that the aspect ratio of the bounding box B1 of the detected object P is smaller than a reference aspect ratio, the processor 260 may determine that the object P is an occlusion object. However, the processor 260 recognizes that the coordinate (e.g., original coordinate (OC)) of the bounding box of the occlusion object is present inside of the surveillance area SA, and the object P enters the surveillance area. However, since the entire bounding box B1 of the occlusion object is detected to the extent as much as a length of an upper body of the person P due to the obstacle Ob, the object P is present outside of the surveillance area SA, an error is existed in the monitoring result of the surveillance camera.

According to an embodiment of the present disclosure, a reference coordinate AC may be estimated by considering the reference aspect ratio of the bounding box B1 of the occlusion object. The bounding box B1 of the occlusion object may be changed to a corrected bounding box B2. The coordinate AC of the object P based on the corrected bounding box B2 may be recognized to be existed outside of the surveillance area SA.

Figure 15:
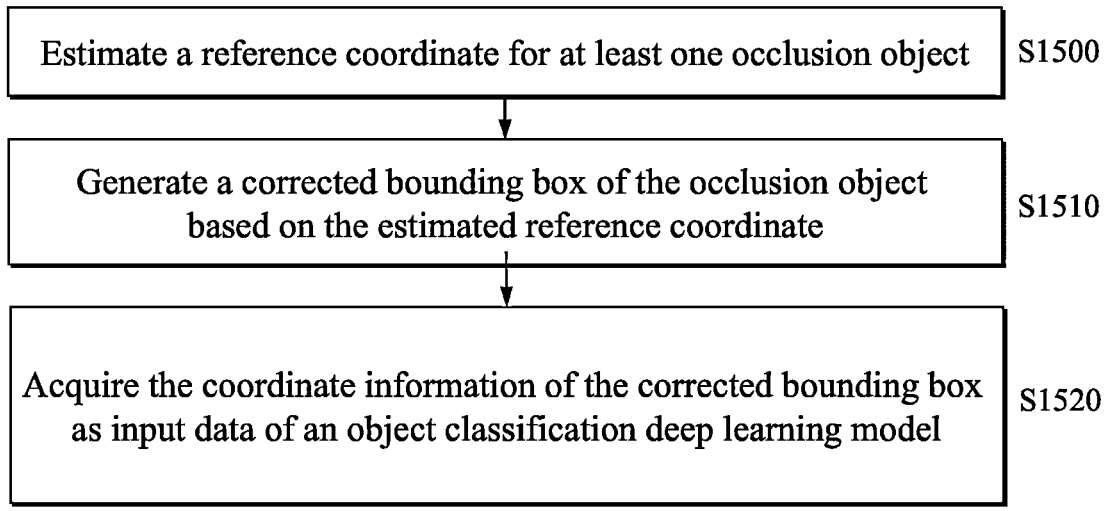
FIG. 15 is a flowchart illustrating an embodiment in which the controlling method of a image processing apparatus according to an embodiment of the present disclosure is applied to acquire a deep learning model input data.
Figure 16:
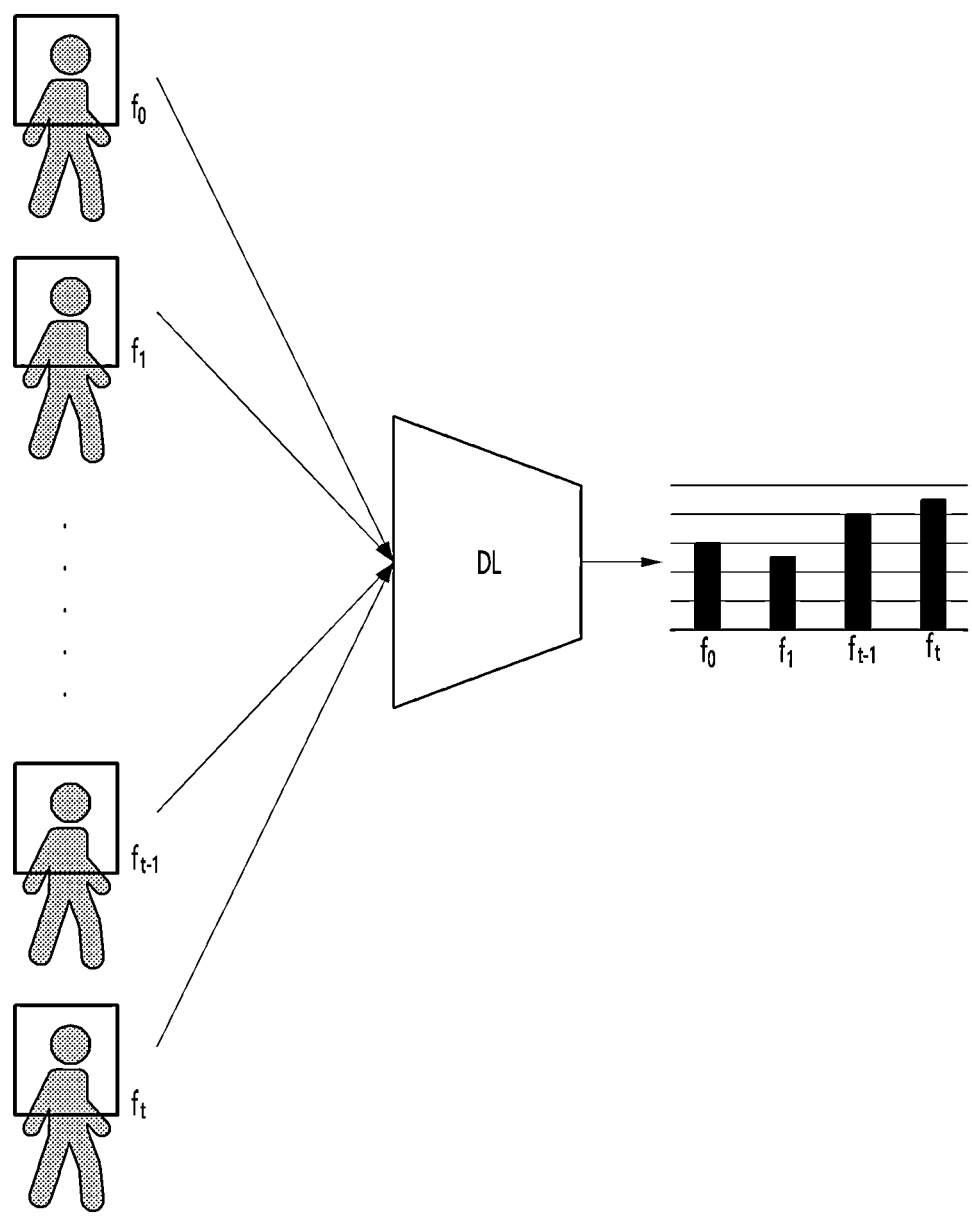
FIG. 16 is a diagram for describing the embodiment shown in FIG. 15 in detail.

FIG. 15 is a flowchart illustrating an embodiment in which the controlling method of a image processing apparatus according to an embodiment of the present disclosure is applied to acquire a deep learning model input data. FIG. 16 is a diagram for describing the embodiment shown in FIG. 15 in detail.

Referring to FIG. 15, the processor 260 may estimate a reference coordinate for at least one occlusion object (step S1500). The method of the embodiments described above may be identically applied to the object detection and the object classification operations. Furthermore, the definition of the embodiments described above may be applied to a definition of a reference coordinate.

The processor 260 may generate a corrected bounding box of the occlusion object based on the estimated reference coordinate (step S1510).

The processor 260 may acquire the coordinate information of the corrected bounding box as input data of an object classification deep learning model (step S1520).

Referring to FIG. 16, an accurate detection result (e.g., coordinate information of a bounding box, etc.) value is to be entered into the deep learning model to utilize the deep learning object detection algorithm to identify an attribute of the object such as a human or a vehicle. However, there is a case that a value of the bounding box for classifying the object is acquired in the unstable state as shown in FIG. 16 (f0, f1, ft−1, and ft). In such a case, the reliability of the result of the deep learning object detection algorithm may be lowered. For example, for the ft case in which the bounding box covers the entire length of the object, the reliability of the object detection result is very high. However, the f1 case corresponds the case that the entire length of the bounding box is less than 50% of the entire length of the object, and in this case, the reliability of the object detection result becomes significantly deteriorated.

The processor 260 may generate the coordinate information of the corrected bounding box of the occlusion object and reconfigure the input data of the deep learning model to output the object detection result by configuring the coordinate information of the corrected bounding box as the input data of the deep learning object detection model.

The present disclosure may be embodied as computer-readable code on a medium having a program recorded thereon. The computer-readable recording medium may be all types of recording devices that can store data which can be read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. Therefore, the detailed description should not be construed as restrictive in all respects and should be considered as illustrative. The scope of this specification should be determined by reasonable interpretation of the appended claims, and all changes within the equivalent scope of this specification are included in the scope of this specification.

What is claimed is:

1. An image processing apparatus comprising:
an image acquisition unit; and
a processor configured to determine that at least a part of an object is occluded based on an aspect ratio of a bounding box that indicates an object detection result from an image acquired through the image acquisition unit being smaller than a predetermined reference aspect ratio and estimate a reference coordinate of the object,
wherein different aspect ratios are applied to the reference aspect ratio according to at least one of a type or an attribute of the object,
wherein the processor is configured to detect the object in the image by using a deep learning algorithm, classify the type or the attribute of the detected object, and compare the aspect ratio of the bounding box with the predetermined reference aspect ratio based on the classified type or attribute of the detected object,
wherein, in case of the type of the object being a human body, and the aspect ratio of the bounding box being smaller than the reference aspect ratio, the processor is configured to:

determine that the bounding box includes a head area of the human body, estimate a tiptoe coordinate of the human body from a coordinate value of the head area, calculate a length of an entire body of the human body, and estimate a result of adding Y coordinate value among center coordinate values of the bounding box including the head area to an integer multiple of a vertical length of the bounding box as a tiptoe coordinate of the human body, and wherein an integer value of the integer multiple is a value of adding the predetermined reference aspect ratio to a value considering a sensitivity of the image acquisition unit.

2. The image processing apparatus of claim 1, wherein the type of the object includes at least one of a human, an animal, or a vehicle, and wherein the attribute of the object includes a feature which is classifiable with different categories among the objects of a same type.

3. The image processing apparatus of claim 1, wherein the reference coordinate is a coordinate for estimating a length of the object before being occluded in a state that at least a part of the object is occluded and includes coordinate information of at least one point between both ends in a length direction of the object which is before being occluded.

4. The image processing apparatus of claim 1, wherein the predetermined reference aspect ratio is changed according to an installation angle of the image acquisition unit.

5. The image processing apparatus of claim 1, wherein the processor is configured to:

in case of at least one object among at least two or more objects detected through the image acquisition unit being detected as the occlusion object, measure an actual distance between the at least two or more objects by applying a reference coordinate to the occlusion object.

6. The image processing apparatus of claim 1, wherein the processor is configured to:

configure a two-dimensional center coordinate value based on a two-dimensional center coordinate value of the bounding box including the head area and a three-dimensional coordinate value of the human body based on calibration information of the image acquisition unit, acquire a three-dimensional coordinate value of a tiptoe from the three-dimensional coordinate value, and estimate a tiptoe coordinate of the human body by transforming the three-dimensional coordinate value of the tiptoe to a two-dimensional center coordinate value based on the calibration information of the image acquisition unit.

7. The image processing apparatus of claim 1, wherein the processor is configured to:

estimate a reference coordinate for at least one occlusion object, generate a corrected bounding box of the occlusion object based on the estimated reference coordinate, and generate coordinate information of the corrected bounding box as input data of a deep learning model for classifying objects.

8. A method for controlling an image processing apparatus, the method comprising:

detecting an object from an image acquired through an image acquisition unit of the image processing apparatus;

comparing an aspect ratio of a bounding box that indicates a detection result of the object with a predetermined reference aspect ratio; and determining that at least a part of an object is occluded based on the aspect ratio of the bounding box being smaller than the predetermined reference aspect ratio and estimating a reference coordinate of the object based on coordinate information of the bounding box, wherein different aspect ratios are applied to the reference aspect ratio according to at least one of a type or an attribute of the object, wherein the object includes a human body, and wherein the method further comprises:

determining that the bounding box includes a head area of the human body based on the aspect ratio of the bounding box being smaller than the reference aspect ratio; and estimating a result of adding Y coordinate value among center coordinate values of a top of the bounding box to an integer multiple of a vertical length of the bounding box as a tiptoe coordinate of the human body, wherein the detecting the object from the image comprises detecting the object in the image by using a deep learning algorithm, classifying the type or the attribute of the detected object, and comparing the aspect ratio of the bounding box with the predetermined reference aspect ratio based on the classified type or attribute of the detected object.

9. The method for controlling an image processing apparatus of claim 8, wherein a gender of the detected object is identified, and the method further comprising:

determining that the bounding box includes the head area of the human body based on the aspect ratio of the bounding box being smaller than the reference aspect ratio;

configuring a two-dimensional center coordinate value based on a two-dimensional center coordinate value of the bounding box including the head area and a stature value of the human body predetermined according to the gender and a three-dimensional coordinate value of the human body based on calibration information of the image acquisition unit;

acquiring a three-dimensional coordinate value of a tiptoe from the three-dimensional coordinate value; and estimating a tiptoe coordinate of the human body by transforming the three-dimensional coordinate value of the tiptoe to a two-dimensional center coordinate value based on the calibration information of the image acquisition unit.

10. A image processing apparatus comprising:

an image acquisition unit; and a processor configured to detect an object from an image acquired through an image acquisition unit, compare an aspect ratio of a bounding box of the detected object with a predetermined reference aspect ratio, estimate a reference coordinate of an occlusion object based on at least a part of the detected object being occluded, and acquire coordinate information of a corrected bounding box of the occlusion object based on the estimated reference coordinate, wherein the processor configures the coordinate information of the corrected bounding box as input data of a deep learning object detection model and outputs an object detection result, and wherein the processor is further configured to:

determine the occlusion object based on the aspect ratio of the bounding box being smaller than the reference aspect ratio, determine that the bounding box of the occlusion object includes only a head area of a human body based on the occlusion object being a human, estimate a tiptoe coordinate of the human body from a coordinate value of the head area, calculate a length of an entire body of the human body, and estimate a result of adding Y coordinate value among center coordinate values of the bounding box including the head area to an integer multiple of a vertical length of the bounding box as a tiptoe coordinate of the human body, and wherein an integer value of the integer multiple is a value of adding the predetermined reference aspect ratio to a value considering a sensitivity of the image acquisition unit.

11. The image processing apparatus of claim 10, wherein different aspect ratios are applied to the reference aspect ratio depending on at least one of a type or an attribute of the object.

12. The image processing apparatus of claim 11, wherein the type of the object includes at least one of a human, an animal, or a vehicle, and wherein the attribute of the object includes a feature which is classifiable with different categories among objects of a same type.

13. The image processing apparatus of claim 10, wherein the reference coordinate is a coordinate for estimating a length of the object before being occluded in a state that at least a part of the object is occluded and includes coordinate information of at least one point between both ends in a length direction of the object which is before being occluded.

14. The image processing apparatus of claim 10, wherein the processor is configured to:

identify a gender of the detected human body, configure a two-dimensional center coordinate value based on a two-dimensional center coordinate value of the bounding box including the head area and a stature value of the human predetermined according to the gender and a three-dimensional coordinate value of the human body based on calibration information of the image acquisition unit, acquire a three-dimensional coordinate value of a tiptoe from the three-dimensional coordinate value, and estimate a tiptoe coordinate of the human body by transforming the three-dimensional coordinate value of the tiptoe to a two-dimensional center coordinate value based on the calibration information of the image acquisition unit.

* * * * *